350-318

1/27/81 XR 4,247,871

United States Patent [19]

Hirsch et al.

[11] 4,247,871

[45] Jan. 27, 1981

[54] FILTER ARRANGEMENT FOR CATHODE RAY TUBE

[75] Inventors: Ulrich Hirsch; Walter Hardt, both of Paderborn, Fed. Rep. of Germany

[73] Assignee: Nixdorf Computer AG, Paderborn, Fed. Rep. of Germany

[21] Appl. No.: 947,172

[22] Filed: Sep. 28, 1978

[30] Foreign Application Priority Data

Sep. 29, 1977 [DE] Fed. Rep. of Germany ... 7730200[U]
Aug. 10, 1978 [DE] Fed. Rep. of Germany ... 7823905[U]

[51] Int. Cl.³ ........................ H04N 5/645; H04N 5/72; G02B 7/00

[52] U.S. Cl. .................................... 358/248; 358/253; 350/318

[58] Field of Search ............... 358/251, 253, 255, 252, 358/248, 5, 247; 350/311, 318; 220/2.1 A; 312/7 TV

[56] References Cited

U.S. PATENT DOCUMENTS

| | | | |
|---|---|---|---|
| 2,436,847 | 3/1948 | Wolfson | 358/253 |
| 2,684,477 | 7/1954 | Fisch | 358/248 |
| 3,084,217 | 4/1963 | Fiore et al. | 358/248 |

FOREIGN PATENT DOCUMENTS

| | | | |
|---|---|---|---|
| 1272812 | 11/1960 | France | 358/251 |
| 1362288 | 4/1964 | France | 358/247 |

*Primary Examiner*—Howard W. Britton
*Assistant Examiner*—Edward L. Coles
*Attorney, Agent, or Firm*—Krass & Young

[57] ABSTRACT

A color filter is placed between the face of a cathode ray tube display unit and a matt black gauze to produce an amber-colored image background. This highlights yellow data characters. The filter is a curved acrylic glass pane either bonded to the tube face in spaced relation or secured thereto by means of a sealing gasket of unique design and construction.

5 Claims, 3 Drawing Figures

FILTER ARRANGEMENT FOR CATHODE RAY TUBE

INTRODUCTION

The invention relates to a filter arrangement for the cathode ray tube of a data display unit, in which a gauze made matt black is placed in front of the screen.

BACKGROUND OF THE INVENTION

In a filter arrangement of the type generally referred to above, the gauze placed in front of the screen prevents a flicker effect which can be seen especially in the display of small data characters on the screen. If the image is observed through the gauze, it is undisturbed as a whole and it is guaranteed that data is evaluated via a data display unit with less fatigue.

The number of characters which can be represented on the screen of a cathode ray tube in data display units is constantly being increased by the improvement of opto-electronic means, so that at the present time several thousand characters can be represented on the screen simultaneously. It is frequently necessary for the operating personnel to observe the screen for the whole day or, alternately, compare text originals with the screen text. Due to the constant increase in the number of characters which can be displayed, the quality of graphic representation also has to be continuously improved. For this purpose, on the one hand, opto-electronic improvements can be introduced and, on the other hand, certain representational colors and contrast values can be selected, in order to make even the smallest characters optimally perceptible and, consequently, also guarantee evaluation without fatigue over a long period.

Thus, it is known, for example, to use for the display of characters on a screen those colors which are adapted to maximal visual discrimination. If, at the same time, the afterglow time is adapted to the properties of the human eye by selecting a suitable phosphor for the screen of the cathode ray tube, it is then possible to obtain optimal representation of characters with the avoidance of afterglow effects.

An especially favorable type of representation exists when yellow characters are displayed on an amber-colored background. This is attributable to the fact that yellow light lies in the region of peak sensitivity of the human eye and can still be perceived clearly even in the case of attenuated representation. If the image background is simultaneously brightened, the reduction in contrast associated therewith lengthens the life of the cathode ray tube.

The problem of the invention is to specify a filter arrangement for a cathode ray tube, which embodies a color filter pane and a mounting structure for disposition of the tube within a case.

This is accomplished by means of the combination of a case having lateral and circumferentially forward structure elements adjacent the tube, a pane of filtering material such as acrylic plastic, and a sealing gasket which grips the edge of the pane and serves the dual function of holding the tube in the proper spaced relation with both the pane and the case. In addition the pane bears directly against the forward structure of the case.

In the preferred form, the gasket comprises a gripping portion of higher hardness and a tubular, cushioning portion of lower hardness, the two portions being integral or substantially integral with one another.

DETAILED DESCRIPTION OF THE ILLUSTRATIVE EMBODIMENT

Figure 1:
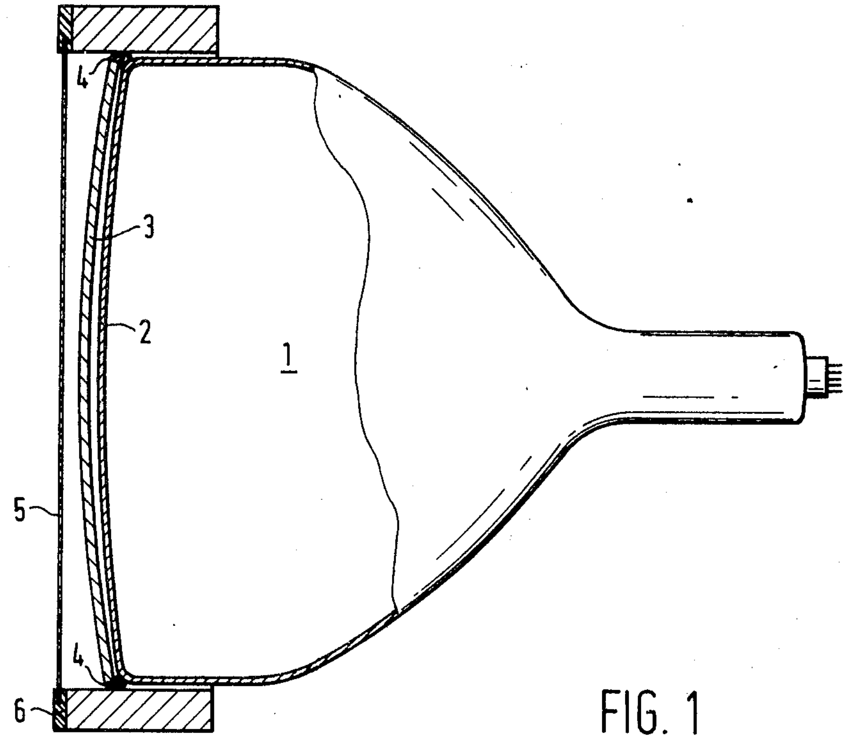
FIG. 1 is a side view partly in cross section of a cathode ray tube embodying the invention.

The cathode ray tube 1 has a screen 2, on the edge of which is seated an acrylic glass pane 3 which is colored in the way specified, for example, orange. Due to the smaller radius of curvature of the acrylic glass pane 3 in relation to the screen 2, there is obtained between the two elements a gap eliminating disturbing optical effects which could be caused by an acrylic glass pane 3 resting on the screen 2 with its entire face.

The acrylic glass pane 3 is connected permanently to the screen 2 by the fact that a silicone rubber adhesive 4 is injected along the edge between both elements. The acrylic glass pane is thereby held permanently against the cathode ray tube 1 and the gap formed between the two is simultaneously sealed outwardly.

A fine-mesh lattice in the form of a gauze 5 is placed in front of the color filter 3 and is stretched in a frame 6. The gauze is colored matt black and eliminates residual flicker effects and reflections when a displayed image is observed, so that an altogether undisturbed image is obtained with optimal coloring.

When the filter arrangement is used, the background brightness of the screen can be adapted to the surroundings via a contrast control. Thus, characters are displayed yellow on an amber-colored ground when a yellow phosphor and an orange-colored filter are used. This type of representation with a brightened image background prevents especially straining of the human eye, since no further adaptation to different changing lighting conditions is required.

Figure 2:
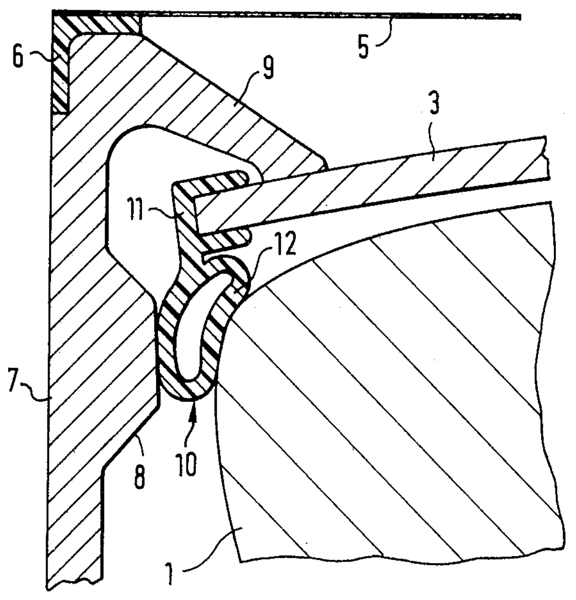
FIG. 2 is an enlarged detail of a portion of the tube and adjacent apparatus.

FIG. 2 represents a horizontal partial section of a further embodiment example of the invention, which differs from that described before in a different kind of attachment of the acrylic plastic plate. The cathode ray tube 1 is arranged in a case 7 which has a profile shown in a sectional representation with a bar 8 provided on the inner wall and a front side piece 9 projecting obliquely inward. A sealing gasket 10 made of a plastic material with its U-shaped part is laid around the acrylic plastic plate of the color filter 3, and with its tube-shaped part 12 it fills out the space between the bar 8 and the cathode ray tube 1. The color filter 3 is held fast with its sealing gasket 10 by the incorporation of the cathode ray tube 1 in the case 7 and is pressed against the inner end of the side piece 9.

Figure 3:
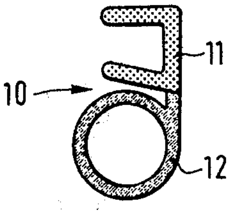
FIG. 3 is an end view of one of the components in the assembly of FIG. 2.

The sealing material consists for example of polyvinyl chloride and advantageously its two parts 11 and 12 have different degrees of hardness. The sealing gasket 10 is represented in FIG. 3 in the unloaded state, and the different degrees of hardness are illustrated by different shadings. Before the mounting, the sealing gasket 10 is cut to the particular length required, which corresponds to the periphery of the color filter 3. The ends of the sealing gasket 10 are then cemented together so that a ring is formed which can be drawn onto the periphery of the color filter 3. Since the U-shaped part 11 of the sealing gasket 10 is formed with at least one of its side pieces converging, a firm seating of this part 11 on the edge of the color filter 3 is obtained. The tube-shaped part 12 of the sealing gasket has a lower hardness than the U-shaped part 11, so it can easily be deformed in shape when the cathode ray tube 1 is introduced into the housing 7, without damaging the cathode ray tube 1. The U-shaped part 11 of the sealing gasket 10 has a higher hardness value, by which its more secure seating on the periphery of the color filter 3 is insured, and with its two side pieces a clamping can be achieved thereby. The suitable hardness values to be chosen have proven to be 96° and 60° shore hardness; Shore A durometer hardness.

The terms "acrylic glass" and "acrylic plastic" are used interchangeably herein to refer to any of several well known polymethylmethacrylates.

The embodiments of the invention in which an exclusive property or privilege is claimed are defined as follows:

1. An apparatus for mounting a cathode ray display tube (1) and a rigid color filter pane (3) in spaced relation within a case (7) having structural elements (8) and (9), respectively, both laterally of and circumferentially forwardly of the tube face and comprising:

an integral sealing gasket (10) having a first portion (11) being approximately 96° Shore A durometer hardness, grippingly disposed about the peripheral edge of the pane (3), and a second portion (12), being approximately 60° Shore A durometer hardness, of hollow tubular construction spaced from said first portion yieldingly disposed against the periphery of the tube (1), and between the tube and the lateral structural element (8) of the case (7);

the pane (3) bearing directly against the circumferentially forward element (9) of the case (7) inwardly of the first portion (11) of the sealing gasket (10) and being urged into such bearing relation by said sealing gasket (10) wherein the second portion (12) of said sealing gasket is moveable independent of the first portion (11) when in the operative arrangement.

2. Apparatus as defined in claim 1 wherein the pane as a radius of curvature which is smaller than the radius of curvature of the tube face.

3. Apparatus as defined in claim 1 wherein the first portion (11) of the sealing gasket (10) comprises spaced parallel flanges for gripping the peripheral edge of the pane (3) therebetween.

4. Apparatus as defined in claim 3 wherein said flanges are disposed in inwardly converging relation to enhance the gripping of the peripheral edge of the pane (3).

5. Apparatus as defined in claim 1 wherein the sealing gasket (10) is constructed of polyvinyl chloride.

* * * * *